(No Model.)
L. K. STRANG.
DOUGH KNEADER.
No. 563,431.  Patented July 7, 1896.
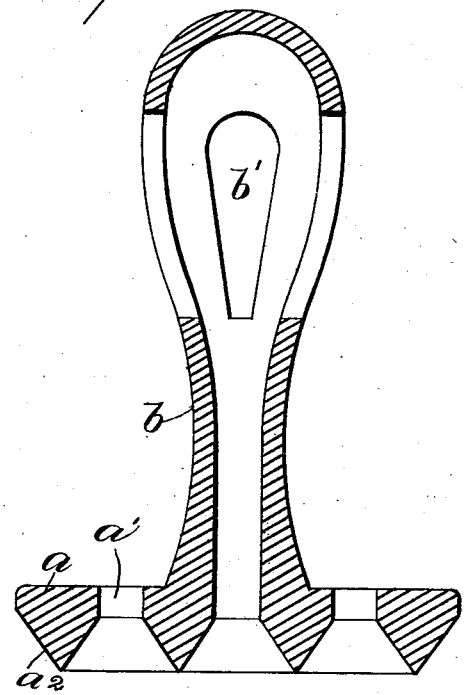
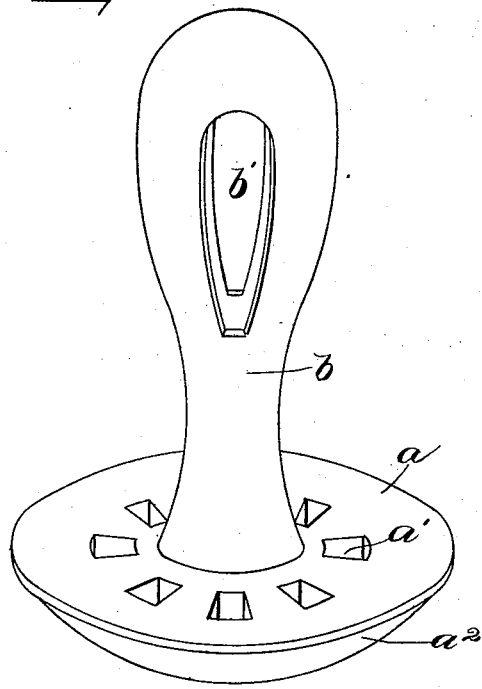
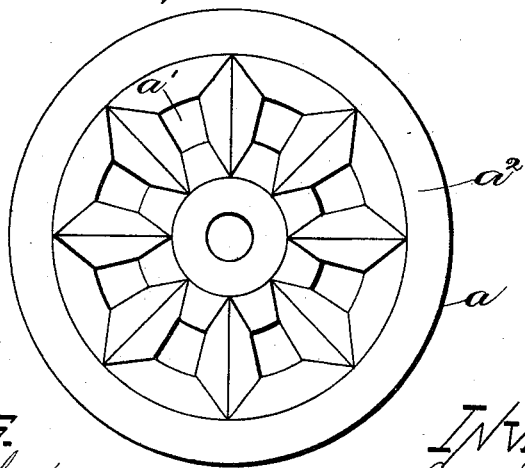
WITNESSES.
Charles B Crocker.
F H Davis
INVENTOR.
Lew K. Strang
by B. J. Noyes,
atty.

UNITED STATES PATENT OFFICE.

LEW K. STRANG, OF GLOUCESTER, MASSACHUSETTS.

DOUGH-KNEADER.

SPECIFICATION forming part of Letters Patent No. 563,431, dated July 7, 1896.

Application filed November 11, 1895. Serial No. 568,560. (No model.)

*To all whom it may concern:*

Be it known that I, LEW K. STRANG, of Gloucester, county of Essex, State of Massachusetts, have invented an Improvement in Dough-Kneaders, of which the following description, in connection with the accompanying drawings, is a specification, like letters on the drawings representing like parts.

This invention has for its object to construct a simple and efficient device adapted to be manipulated by hand to knead dough.

The device consists, essentially, of a circular or other-shaped plate having a handpiece by means of which it may be manipulated, the plate having holes through it for the escape of the gases as it is forced or pressed into the dough, and to enable said plate to sink deeply or cut into the dough it is formed on its under side with V-shaped portions, and these are arranged in such manner as to form the side walls of the holes through the plate. The holes are arranged in a circle and quite close together, and are made more or less rectangular, and at the center of the plate a circular hole is formed. By thus forming and arranging the holes the entire under or contacting surface of the plate presents V-shaped portions. The handle is made hollow with lateral openings, and communicates with the central hole in the plate, thereby providing an outlet for the gas which passes through said central hole.

Figure 1 shows in side elevation a dough-kneading device embodying this invention; Fig. 2, a vertical section of the same; and Fig. 3 an under side view of the device, showing particularly the V-shaped portions.

The plate $a$ of circular or other shape has formed integral therewith or attached thereto a handpiece $b$.

The plate $a$ is formed with several holes $a'$ through it, they being herein shown as arranged in a circle and made more or less rectangular, and these holes are made to gradually increase in area toward the under or contacting face of the plate, so much so, in fact, that at the under or contact face V-shaped portions are formed between the holes. The edge of the plate is beveled, as at $a^2$.

At the center of the plate $a$ a circular hole is formed, which likewise gradually increases in area to the under or contact face of the plate, so that the entire under surface of the plate $a$ is formed with or has V-shaped or cutting portions.

The handpiece $b$ is made hollow and provided with side openings $b'$, and the passage through said handpiece communicates with the central hole in the plate.

The operator, with the device in hand, forces or presses it into the dough, the V-shaped portions enabling it to sink deeply or cut into the dough, while the holes provide ample escape for the gases.

It will be observed that the kneader is composed of a relatively large number of small cells arranged in the lower part of the plate, the surfaces of which are inclined and from which extend small gas-escape holes. It is essential for the proper working of the kneader, first, that these cells be small; second, that the surfaces be such as to cause a compressing action upon the dough forced into them, and, third, that the outlets $a'$ be so small and so proportioned in relation to the cells that the dough be not forced up through and above them, the purpose of the cells and outlets being to compress the dough within their scope and cause the gas to be gathered in the dough at the upper ends of the cells, from which it escapes upon a continuation of the pressure through the outlets $a'$.

I claim—

1. A dough-kneader comprising a plate having in its under surface small cells, the walls of which are inclined to exert a compressing action upon the dough as the kneader is forced into it, and which plate also has opening from the cells the small air-escape passages $a'$, as and for the purposes described.

2. A dough-kneader of the character specified, having cells in its under surface provided with inclined walls and small air-escape passages $a'$ opening from the upper ends of said cells with a hollow handle $b$ integral within the plate and arranged over one of the cells, the cavity of which has the outlet $b'$, and which serves as a means by which gas may escape from the said cell, as and for the purposes described.

In testimony whereof I have signed my name to this specification in the presence of two subscribing witnesses.

LEW K. STRANG.

Witnesses:
B. J. NOYES,
F. H. DAVIS.